(12) United States Patent
Vargantwar

(10) Patent No.: US 8,509,704 B1
(45) Date of Patent: Aug. 13, 2013

(54) METHOD AND SYSTEM OF SENDING POWER CONTROL COMMANDS

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 481 days.

(21) Appl. No.: 12/854,725

(22) Filed: Aug. 11, 2010

(51) Int. Cl.
*H04B 7/00* (2006.01)

(52) U.S. Cl.
USPC .............................................. 455/69; 455/231

(58) Field of Classification Search
USPC ............................ 455/69, 231, 522
See application file for complete search history.

(56) References Cited

U.S. PATENT DOCUMENTS

| | | | |
|---|---|---|---|
| 5,603,096 A * | 2/1997 | Gilhousen et al. ............. | 455/69 |
| 6,208,873 B1 | 3/2001 | Black et al. | |
| 6,256,301 B1 | 7/2001 | Tiedemann, Jr. et al. | |
| 2004/0092233 A1 | 5/2004 | Rudrapatna | |
| 2005/0143113 A1 | 6/2005 | Lee et al. | |
| 2005/0153671 A1 | 7/2005 | Ichikawa | |
| 2007/0191044 A1 | 8/2007 | Kostic et al. | |
| 2009/0111400 A1 * | 4/2009 | Kazmi et al. ................ | 455/127.1 |

* cited by examiner

*Primary Examiner* — Tu X Nguyen

(57) ABSTRACT

Based on forward signal quality detected by an access terminal, an access network may adjust the transmission rate at which to send power control commands (PCCs) to the access terminal and responsively begin sending PCCs directed to the access terminal at the adjusted transmission rate. For example, in response to determining that the access terminal is detecting a strong forward signal quality, the access network may begin sending PCCs directed to the access terminal at a reduced transmission rate of one PCC in less than every timeslot. In timeslots during which the access network does not send a PCC directed to the access terminal, the access network can then send PCCs directed to other active access terminals at a higher gain, which may in turn increase the percentage of PCCs received by the other active access terminals.

20 Claims, 4 Drawing Sheets

Forward-Link Timeslots

| Access Terminals | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ |
|---|---|---|---|---|---|---|---|---|---|---|---|---|---|---|---|
| 14a | 4.0 W | 4.0 W | 4.0 W | 4.0 W | - | 4.0 W | - | 4.0 W | - | 4.0 W | 5.3 W | 4.0 W | 5.3 W | 4.0 W | 5.3 W |
| 14b | 4.0 W | 4.0 W | 4.0 W | 4.0 W | 5.3 W | 4.0 W | 5.3 W | 4.0 W | - | 4.0 W | - | 4.0 W | - | 4.0 W | - |
| 14c | 4.0 W | 4.0 W | 4.0 W | 4.0 W | 5.3 W | 4.0 W | 5.3 W | 4.0 W | 8.0 W | 4.0 W | 5.3 W | 4.0 W | 5.3 W | 4.0 W | 5.3 W |
| 14d | 4.0 W | 4.0 W | 4.0 W | 4.0 W | 5.3 W | 4.0 W | 5.3 W | 4.0 W | 8.0 W | 4.0 W | 5.3 W | 4.0 W | 5.3 W | 4.0 W | 5.3 W |

FIG. 3

METHOD AND SYSTEM OF SENDING POWER CONTROL COMMANDS

BACKGROUND

To provide cellular wireless communication service, a wireless service provider typically operates an access network that functions to connect one or more access terminals (e.g., cell phones, PDAs, laptops, netbooks, tablets, and/or other wirelessly-equipped devices) with one or more transport networks. In a typical access network, an area is divided geographically into a number of coverage areas, such as cells and sectors, each defined by a radio frequency (RF) radiation pattern from a respective base transceiver station (BTS). Within each coverage area, the BTS's RF radiation pattern may provide one or more wireless links, each on a carrier (or set of carriers), over which access terminals may communicate with the access network. In turn, the access network may provide connectivity with the public switched telephone network (PSTN), the Internet, and/or other transport networks.

The wireless links may carry communications between the access network and the access terminals according to any of a variety of wireless protocols. Depending on the protocol employed, each wireless link may also be divided into a plurality of channels for carrying communications between the access network and the access terminals. For example, each wireless link may include a plurality of forward-link channels, such as forward traffic channels, for carrying communications from the access network to the access terminals. As another example, each wireless link may include a plurality of reverse-link channels, such as reverse traffic channels, for carrying communications from the access terminals to the access network. In many wireless protocols, the access network and active access terminals may engage in a power-control process to control transmission power for communications over established traffic channels. For purposes of illustration, the embodiments herein will be described by way of example with reference to a power-control process carried out by the access network to control the reverse transmission power of the active access terminals. It should be understood, however, that a similar power-control process may be carried out by the active access terminals to control the forward transmission power of the access network.

In an example power-control process, an access network may regularly send power control commands (PCCs) directed to the active access terminal, to control the active access terminal's transmission power on a reverse traffic channel with the access network (i.e., the reverse transmission power). For example, the access network may regularly compare a signal-quality metric of reverse traffic-channel communications received from the active access terminal to a signal-quality threshold value and thereby decide whether to send a "power up" PCC that instructs the active access terminal to increase its reverse transmission power or a "power down" PCC that instructs the active access terminal to decrease its reverse transmission power. For instance, if the signal-quality metric is less than the signal-quality threshold value (thus indicating a weaker signal), the access network may send a "power up" PCC directed to the active access terminal. Alternatively, if the signal-quality metric is greater than the signal-quality threshold value (thus indicating a stronger signal), the access network may send a "power down" PCC directed to the active access terminal.

As a result of the access network regularly sending PCCs directed to the active access terminal, the active access terminal may regularly receive PCCs from the access network. (It should be understood, however, that the active access terminal may fail to receive some PCCs sent by the access network due to poor forward-link conditions or other factors.) In response to each PCC received from the access network, the active access terminal may then responsively adjust its reverse transmission power in accordance with the PCC. For instance, in response to receiving a "power up" PCC from the access network, the active access terminal may increase its reverse transmission power. And in response to receiving a "power down" PCC from the access network, the active access terminal may decrease its reverse transmission power.

Advantageously, this power-control process may enable the active access terminal and the access network to balance between keeping traffic-channel communications strong enough to overcome interference and preventing traffic-channel communications from becoming so strong that they unduly interfere with other communications.

Overview

In some protocols such as EIA/TIA/IS-856 Rel. 0, Rev. A, or other versions thereof (hereafter "IS-856"), an access network may use power-division multiplexing to send power control commands (PCCs) directed to the active access terminals in a given coverage area. In particular, during every timeslot of a given forward link, the access network may divide the total forward-link power equally between all active access terminals in the coverage area, such that the gain of the PCCs directed to each of the active access terminals is inversely proportional to the total number of active access terminals at that time. For example, if the full forward-link power is 16 watts and there are two active access terminals during a given timeslot, the access network may send 8-watt PCCs directed to each of the two active access terminals during the given timeslot. As another example, if the full forward-link power is 16 watts and there are four active access terminals during a given timeslot, the access network may send 4-watt PCCs directed to each of the four active access terminals during the given timeslot. Many other examples are possible as well.

According to this PCC transmission scheme, the access network may be sending PCCs directed to each of the active access terminals at a PCC transmission rate of one PCC in every timeslot. An active access terminal may not actually be receiving all of its PCCs, however. Instead, the active access terminal may be receiving only a percentage of its PCCs, with that percentage depending both on the gain of the PCCs and the forward signal quality detected by the active access terminal (e.g., $E_c/I_o$, signal to interference plus noise ratio (SINR), and/or carrier-to-interference ratio (C/I)). For instance, if the access network is sending PCCs at a lower gain and the access terminal is detecting a weaker forward signal quality, the access terminal may only be receiving a small percentage of its PCCs (e.g., less than 25%). This small percentage of received PCCs may in turn result in the active access terminal failing to properly adjust its reverse transmission power. Accordingly, a PCC transmission scheme that increases the percentage of PCCs received by access terminals detecting a weaker forward signal quality is desirable.

Disclosed herein is such a PCC transmission scheme. According to an exemplary PCC transmission scheme, an access network will adjust a PCC transmission rate for an active access terminal (i.e., how often to send PCCs directed to the active access terminal) based on the forward signal quality detected by the active access terminal. For example, in response to determining that an active access terminal is detecting a stronger forward signal quality—and is thus receiving a larger percentage of its PCCs—the access network may begin sending PCCs directed to the active access terminal at a reduced transmission rate of one PCC in less than every forward-link timeslot. In the forward-link timeslots during which the access network does not send a PCC directed to the active access terminal, the access network can then send PCCs directed to other active access terminals at a higher gain. These higher-gain PCCs may in turn increase the percentage of PCCs received by the other active access terminals, which is especially advantageous for the other active access terminals that are detecting a weaker forward signal quality and are thus receiving a smaller percentage of their PCCs.

One embodiment may take the form of a method of sending PCCs directed to a first active access terminal of a plurality of active access terminals in a given coverage area. The method may include an access network (a) sending a first series of PCCs directed to the first active access terminal at a current transmission rate, (b) maintaining an indicator of forward signal quality detected by the first active access terminal, (c) based on the maintained indicator of forward signal quality detected by the first active access terminal, deciding to adjust the transmission rate at which to send PCCs directed to the first active access terminal, and (d) in response to deciding to adjust the transmission rate, sending a second series of PCCs directed to the first active access terminal at the adjusted transmission rate.

The current transmission rate and the adjusted transmission rate make take various forms. In one example, the current transmission rate may be one PCC in every forward-link timeslot and the adjusted transmission rate may be one PCC in less than every forward-link timeslot (e.g., every other timeslot). In an alternate example, the current transmission rate may be one PCC in less than every forward-link timeslot (e.g., every other timeslot) and the adjusted transmission rate may be one PCC in every forward-link timeslot. Other examples are possible as well. Further, the maintained indicator of forward signal quality detected by the first active access terminal may take various forms. In one example, the maintained indicator may be an indicator generated based on information received from the first active access terminal. For instance, the access network may be receiving from the first active access terminal a series of messages on an IS-856 data rate control (DRC) channel, where each message includes a DRC value, in which case the maintained indicator may be an indicator generated based on one or more of the DRC values (e.g., a last DRC value received from the first active access terminal or an average of DRC values recently received from the first active access terminal). Other examples are possible as well.

Further yet, sending the first and second series of PCCs directed to the first active access terminal may take various forms. For example, this feature may comprise using power-division multiplexing to send the first and second series of PCCs directed to the first active access terminal together with PCCs for one or more other active access terminals. Other examples are possible as well.

Still further, deciding to adjust the PCC transmission rate for the first active access terminal based on the maintained indicator of forward signal quality detected by the first active access terminal may take various forms. In one example, this feature may comprise deciding to adjust the PCC transmission rate for the first active access terminal based on a comparison between the maintained indicator of forward signal quality detected by the first active access terminal and a threshold value. For instance, this feature may include (1) comparing the maintained indicator to the threshold value and thereby determining that the maintained indicator is greater than the threshold value and (2) in response to determining that the maintained indicator is greater than the threshold value, deciding to decrease the transmission rate at which to send PCCs directed to the first active access terminal. Alternatively, this feature may include (1) comparing the maintained indicator to the threshold value and thereby determining that the maintained indicator is less than the threshold value and (2) in response to determining that the maintained indicator is less than the threshold value, deciding to increase the transmission rate at which to send PCCs directed to the first active access terminal.

In another example, this feature may comprise deciding to adjust the PCC transmission rate for the first active access terminal based on a table correlating indicators of forward signal qualities with transmission rates. For instance, this feature may include (1) consulting the table to identify a transmission rate that correlates to the maintained indicator of the forward signal quality detected by the first active access terminal, (2) determining that the identified transmission rate differs from the current transmission rate, and (3) in response to determining that the identified transmission rate differs from the current transmission rate, deciding to adjust the transmission rate to the identified transmission rate. Other examples are possible as well.

Another embodiment may take the form of a method of sending, on a forward link comprising a plurality of timeslots, PCCs directed to a plurality of active access terminals in a given coverage area. The method may include (a) maintaining an indicator of forward signal quality detected by each of the plurality of active access terminals, (b) during a first series of timeslots, sending PCCs directed to each of the plurality of active access terminals in every timeslot, (c) determining that a maintained indicator of forward signal quality detected by a first active access terminal of the plurality of active access terminals is greater than a threshold value, and (d) in response to determining that the maintained indicator of forward signal quality detected by the first active access terminal is greater than the threshold value, during a second series of timeslots, sending PCCs directed to the first active access terminal in less than every timeslot (e.g, every other timeslot) and sending PCCs directed to the other active access terminals in every timeslot.

Sending the PCCs directed to each of the plurality of active access terminals in every timeslot of the first series of timeslots may take various forms. In one example, this feature include, during each timeslot of the first series of timeslots, (1) dividing a total power of the forward link equally between each of the plurality of active access terminals and thereby allocating a first gain to the PCCs directed to each of the plurality of active access terminals, and (2) sending the PCCs directed to each of the plurality of active access terminals at the first gain. Other examples are possible as well.

In turn, sending the PCCs directed to the first active access terminal in less than every timeslot of the second series of timeslots and sending the PCCs directed to the other active access terminals in every timeslot of the second series of timeslots may take various forms. In one example, this feature may include, (1) during each timeslot of a first group of the second series of timeslots, (i) dividing a total power of the forward link equally between each of the plurality of active access terminals and thereby allocating a first gain to the PCCs directed to each of the plurality of active access terminals, and (ii) sending the PCCs directed to each of the plurality of active access terminals at the first gain, and (2) during each timeslot of a second group of the second series of timeslots, (i) dividing a total power of the forward link equally between each of the other active access terminals and thereby allocating a second gain to the PCCs directed to each of the other active access terminals, wherein the second gain is higher than the first gain, and (ii) sending the PCCs directed to each of the other active access terminals at the second gain. Other examples are possible as well.

This exemplary method may also include additional features. For instance, the method may additionally include (e) determining that a maintained indicator of forward signal quality detected by a second active access terminal of the plurality of active access terminals is greater than the threshold value, and (f) in response to determining that the maintained indicator of forward signal quality detected by the second active access terminal is greater than the threshold value, during a third series of timeslots, sending PCCs directed to the first active access terminal and the second active access terminal in less than every timeslot and sending PCCs directed to the other active access terminals in every timeslot. Further, the method may additionally include (g) determining that the maintained indicator of forward signal quality detected by first active access terminal is less than the threshold value, and (h) in response to determining that the maintained indicator of forward signal quality detected by first active access terminal is less than the threshold value, during a fourth series of timeslots, sending PCCs directed to the second active access terminal in less than every timeslot and sending PCCs directed to the other active access terminals in every timeslot. Other examples are possible as well.

Yet another embodiment may take the form of a base transceiver station (BTS) that includes (a) wireless communication configured to provide at least one wireless link over which to communicate with a plurality of active access terminals in a given coverage area, (b) a radio network controller (RNC) communication interface configured to provide connectivity with an RNC, (c) a processor, (d) data storage, and (e) program instructions stored in data storage and executable by the processor to carry out the functions described herein. The BTS may also include program data stored in data storage, and this program data may take various forms. For example, the program data may include a threshold value for comparison with the maintained indicator of forward signal quality detected by the first active access terminal. As another example, the program data may include a table correlating indicators of forward signal qualities with transmission rates. As still another example, the program data may include an indicator of a transmission rate at which the BTS is sending PCCs directed to each of the plurality of active access terminals. Other examples are possible as well.

These as well as other aspects and advantages will become apparent to those of ordinary skill in the art by reading the following detailed description, with reference where appropriate to the accompanying drawings.

BRIEF DESCRIPTION OF THE DRAWINGS

FIG. 3 is a chart that illustrates a rate and power of PCCs sent from an access network to active access terminals on a time-division multiplexed forward link.

DETAILED DESCRIPTION

I. Communications System

Figure 1:
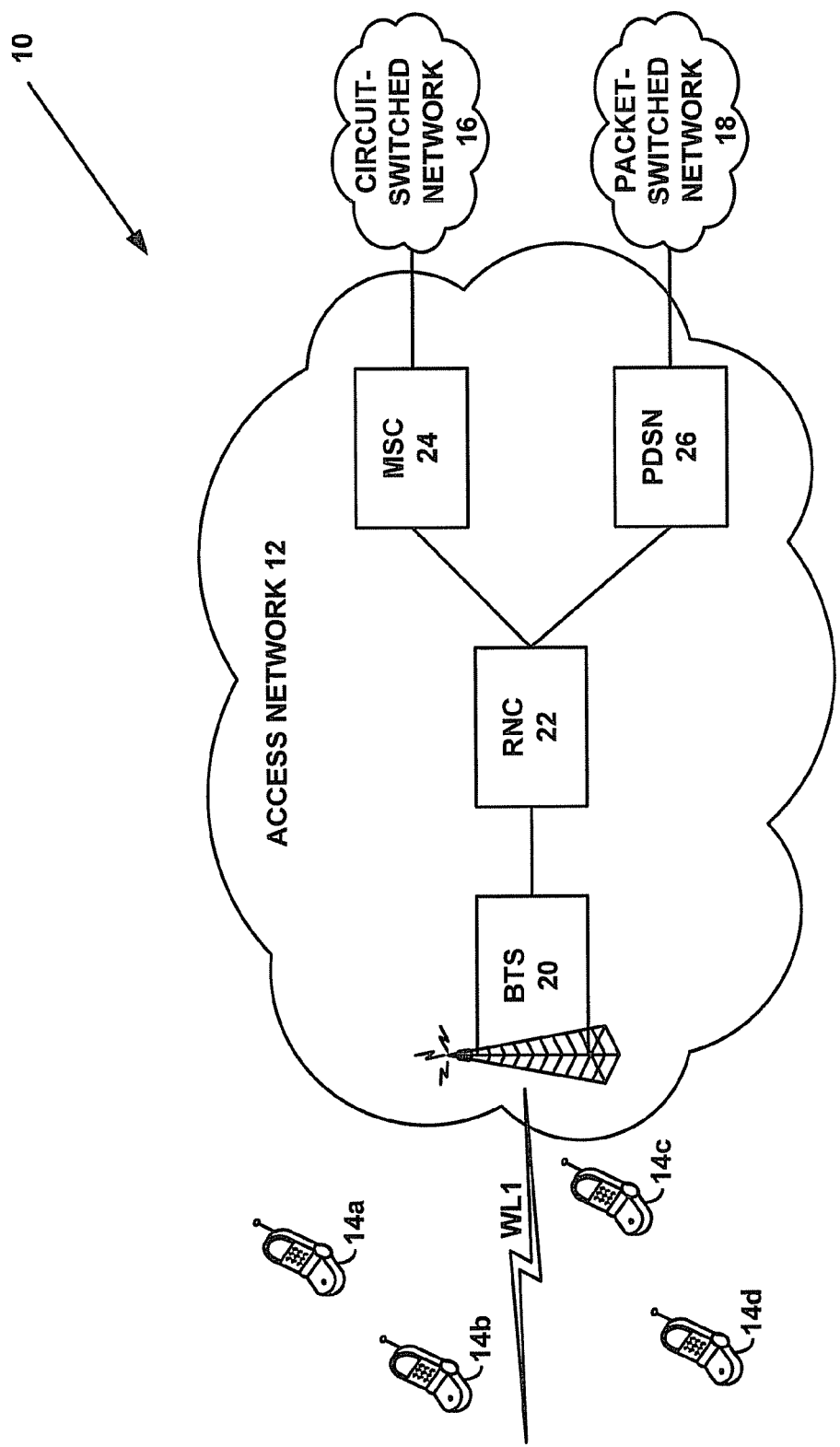
FIG. 1 is a simplified block diagram of a communication system in which an exemplary method can be implemented.

FIG. 1 is a simplified block diagram of a communications system 10 in which an example method can be implemented. As shown, the system 10 may include an access network 12 that functions to provide connectivity between one or more access terminals (e.g., cell phones, PDAs, laptops, netbooks, tablets, and/or other wirelessly-equipped devices), such as active access terminals 14a-d, and one or more transport networks, such as a circuit-switched network 16 (e.g., the Public Switched Telephone Network (PSTN)) and a packet-switched network 18 (e.g., the Internet).

It should be understood that the arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions written in any suitable programming language (e.g., C, C++, Java, etc.) and stored in memory.

As shown in FIG. 1, access network 12 may include a base transceiver station (BTS), such as BTS 20. (Although FIG. 1 depicts access network 12 as including one BTS, it should be understood that access network 12 may include a plurality of BTSs.) BTS 20 may be any entity that facilitates wireless communication between access network 12 and access terminals 14a-d. In this respect, BTS 20 may radiate to define one or more wireless coverage areas, such as a cell and/or cell sectors. Within each coverage area, BTS 20 may provide at least one wireless link on a respective carrier frequency, such as wireless link $WL_1$, over which access terminals 14a-d may communicate with BTS 20. (As used herein, the term "carrier frequency" may include a single carrier frequency or a set of carrier frequencies). BTS 20 may also function to control aspects of wireless communication with access terminals 14a-d, such as aspects of a power-control process.

Wireless link $WL_1$ may carry communications between access network 12 and access terminals 14a-d according to any of a variety of protocols, such as CDMA (e.g., IS-2000 or IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, or other protocols now known or later developed. Further, wireless link $WL_1$ may be divided into a forward link for carrying communications from access network 12 to access terminals 14a-d and a reverse link for carrying communications from access terminals 14a-d to access network 12. In turn, the forward link and the reverse link may be divided into a plurality of channels.

For purposes of illustration, the embodiments herein will be described by way of example with reference to IS-856. According to IS-856, wireless link $WL_1$ may be identified by its carrier frequency and a unique pseudonoise offset ("PN offset") that distinguishes wireless link $WL_1$ from wireless links in adjacent coverage areas.

Further, according to IS-856, the forward link may be time-division multiplexed such that the full forward-link power can be allocated to a single active access terminal at any given time. For example, the forward link may be time-division multiplexed into timeslots with a length of 2048 chips and duration of approximately 1.67 milliseconds (ms), and access network 12 may dynamically assign each timeslot to a single access terminal as necessary. Each forward-link timeslot may further be time-division multiplexed to carry various forward-link channels. For example, a forward-link timeslot may be divided into two 524-chip half-slots, each arranged to carry a 96-chip forward pilot channel at its center and two 64-chip forward medium access control (MAC) channel segments on either side of the pilot channel. The remaining 1600 chips of the forward-link timeslot (800 per half-slot) may then be allocated for either a forward control channel or a forward traffic channel. Other examples may exist as well.

Further yet, according to IS-856, the reverse link may be code division multiplexed such that a portion of the reverse-link power is allocated to each active access terminal for the time period during which the access terminal is active. For example, the reverse link may be code-division multiplexed via Walsh codes into reverse access channels and reverse traffic channels. In turn, each reverse channel may be divided into various sub-channels. For example, a reverse access channel may include a pilot channel and a data channel. As another example, a reverse traffic channel may include a pilot channel, a reverse rate indicator (RRI) channel, a data rate control (DRC) channel, a data source control (DSC) channel, an acknowledgment (ACK) channel, and a data channel. Other examples may exist as well.

As further shown in FIG. 1, BTS 20 of access network 12 may couple to a radio network controller (RNC), such as RNC 22. (Although FIG. 1 depicts access network 12 as including one RNC, it should be understood that access network 12 may include more than one RNC, in which case each RNC may couple to a subset of the BTSs in access network 12. Further, although BTS 20 and RNC 22 are depicted as separate entities, it should be understood that these entities may be integrated together, in which case BTS 20 and RNC 22 may together be referred to as an "access node.") RNC 22 may function to communicate with BTS 20 and control aspects of wireless communication with access terminals 14a-d. RNC 22 may also provide connectivity with one or more transport networks via one or more switches or gateways. For example, as shown, the RNC 22 may couple to mobile switching center (MSC) 24 that provides connectivity with circuit-switched network 16 and packet data serving node (PDSN) 26 that provides connectivity with packet-switched network 18. Other examples are possible as well.

II. Current PCC Transmission Scheme

In the example communication system 10 described in FIG. 1, BTS 20 may regularly send PCCs directed to each of active access terminals 14a-d, to control each access terminals' transmission power on a respective reverse traffic channel with BTS 20 (i.e. the reverse transmission power). For example, BTS 20 may regularly compare a signal quality metric (e.g., $E_b/N_o$) of reverse traffic channel communications received from access terminal 14a to a signal-quality threshold value and thereby decide whether to send a "power up" PCC that instructs access terminal 14a to increase its reverse transmission power or a "power down" PCC that instructs access terminal 14a to decrease its reverse transmission power. For instance, if the signal-quality metric is less than the signal-quality threshold value (thus indicating a weaker signal), BTS 20 may send a "power up" PCC directed to access terminal 14a. Alternatively, if the signal-quality metric is greater than the signal-quality threshold value (thus indicating a stronger signal), BTS 20 may send a "power down" PCC directed to access terminal 14a.

As a result of BTS 20 regularly sending PCCs directed to access terminal 14a, access terminal 14a may regularly receive PCCs from BTS 20. (It should be understood, however, that access terminal 14a may fail to receive some PCCs sent by BTS 20 due to poor forward-link conditions or other factors.) In response to each PCC received from BTS 20, access terminal 14a may then responsively adjust its reverse transmission power in accordance with the PCC. For instance, in response to receiving a "power up" PCC from BTS 20, access terminal 14a may increase its reverse transmission power. And in response to receiving a "power down" PCC from BTS 20, access terminal 14a may decrease its reverse transmission power.

In a current IS-856 PCC transmission scheme, BTS 20 may use power-division multiplexing to send PCCs directed to all active access terminals in a given coverage area. In particular, during the MAC channel segment of every forward-link timeslot, BTS 20 may divide the total forward-link power equally between all active access terminals, such that the gain of the PCCs directed to each of the active access terminals is inversely proportional to the total number of active access terminals at that time. For example, if the full forward-link power is 16 watts and there are two active access terminals during a given timeslot, BTS 20 may send 8-watt PCCs directed to each of the two active access terminals during the given timeslot. As another example, if the full forward-link power is 16 watts and there are four active access terminals during a given timeslot, BTS 20 may send 4-watt PCCs directed to each of the four active access terminals during the given timeslot. Many other examples are possible as well.

As noted above, according to the current IS-856 PCC transmission scheme, BTS 20 may regularly send PCCs directed to each of the active access terminals at a PCC transmission rate of one PCC in every forward-link timeslot. An active access terminal may not actually be receiving all of its PCCs, however. Instead, the active access terminal may be receiving only a percentage of its PCCs, with that percentage depending both on the gain of the PCCs and the forward signal quality detected by the active access terminal (e.g., $E_c/I_o$, signal to interference plus noise ratio (SINR), and/or carrier-to-interference ratio (C/I)). For instance, if BTS 20 is sending PCCs at a lower gain and the access terminal is detecting a weaker forward signal quality, the access terminal may only be receiving a small percentage of its PCCs (e.g., less than 25%). This small percentage of received PCCs may in turn result in the active access terminal failing to properly adjust its reverse transmission power. Accordingly, a PCC transmission scheme that increases the percentage of PCCs received by access terminals detecting a weaker forward signal quality is desirable.

III. Exemplary PCC Transmission Scheme

As noted above, disclosed herein is an exemplary PCC transmission scheme in which access network 12 will adjust a PCC transmission rate for an active access terminal (i.e., how often to send PCCs directed to the active access terminal) based on the forward signal quality detected by the active access terminal. For example, in response to determining that an active access terminal is detecting a stronger forward signal quality—and is thus receiving a larger percentage of its PCCs—the access network may begin sending PCCs directed to the active access terminal at a reduced transmission rate of one PCC in less than every forward-link timeslot. In the forward-link timeslots during which the access network does not send a PCC directed to the active access terminal, the access network can then send PCCs directed to other active access terminals at a higher gain. These higher-gain PCCs may in turn increase the percentage of PCCs received by the other active access terminals, which is especially advantageous for the other active access terminals that are detecting a weaker forward signal quality and are thus receiving a smaller percentage of their PCCs.

Figure 2:
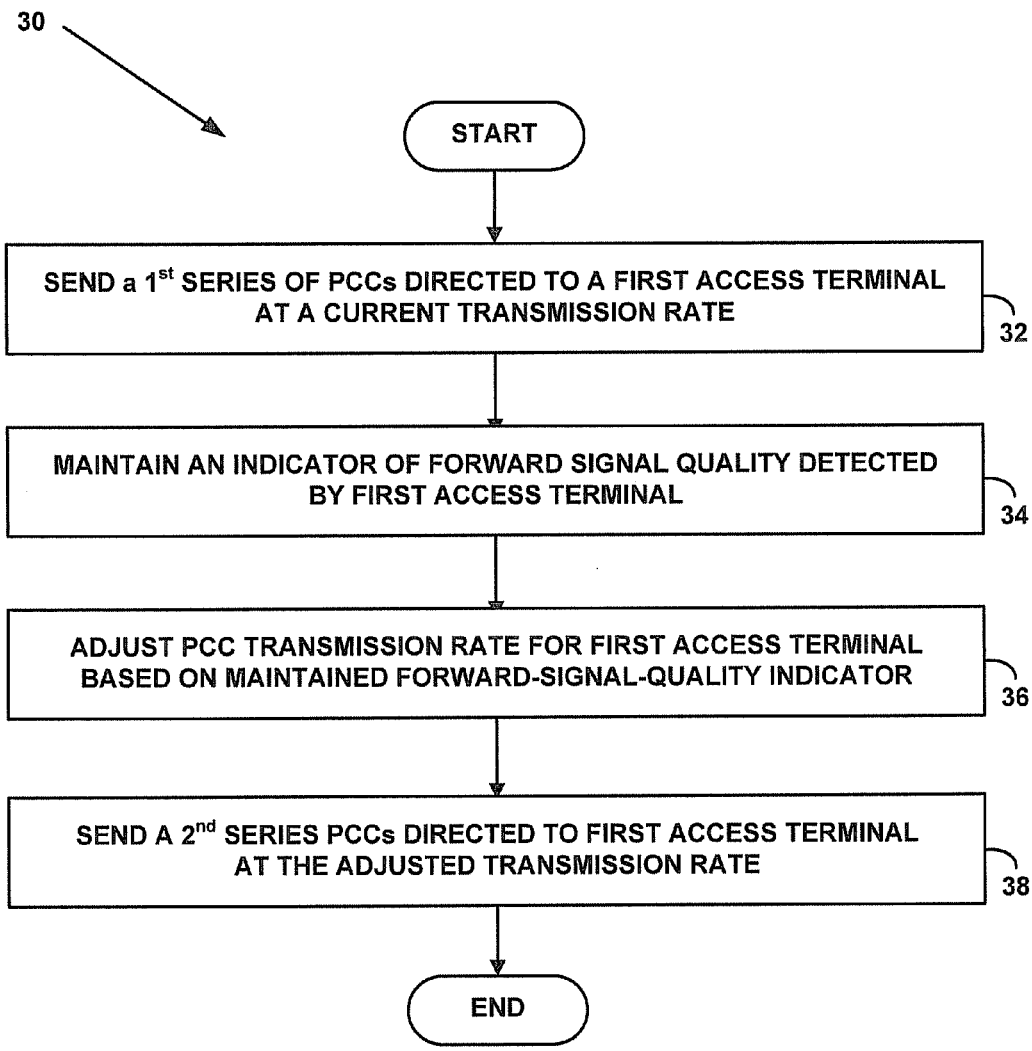
FIG. 2 is a flow chart depicting an exemplary method of sending power control commands (PCCs) to a first active access terminal of a plurality of active access terminals in a given coverage area.

FIG. 2 is a flow chart depicting an exemplary method 30 of sending PCCs directed to a first active access terminal of a plurality of active access terminals in a given coverage area. As one example, an access network may send PCCs directed to the first active access terminal according to exemplary method 30 for the entire time period during which the access terminals is active. As another example, an access network may send PCCs directed to the first active access terminal according to exemplary method 30 only in certain circumstances, such as when the total number of active terminals rises above a threshold value and/or the gain allocated to PCCs directed to each respective active access terminal falls below a threshold value. In this example, the access network may alternate between sending PCCs directed to the first active access terminal according to exemplary method 30 and sending PCCs directed to the first active access terminal according to another process, such as the current IS-856 PCC transmission scheme described above.

For purposes of illustration, exemplary method 30 will be described with reference to BTS 20 sending PCCs directed to active access terminal 14a (the following description assumes that BTS 20 is sending PCCs directed to the other active access terminals 14b-d at a rate of one PCC in every forward-link timeslot). It should be understood, however, that exemplary method 30 may be applicable to any configuration in which a first entity is sending PCCs directed to a second entity. Further, it should be understood that more than one entity (e.g., both BTS 20 and RNC 22) may carry out features of exemplary method 30.

As shown in FIG. 2, exemplary method 30 begins at step 32 with BTS 20 sending a first series of PCCs directed to access terminal 14a at a current transmission rate (e.g., one PCC every timeslot, one PCC every other timeslot, etc.). (As used herein, the phrase "current transmission rate" means any rate at which BTS 20 is sending PCCs directed to access terminal 14a before deciding to adjust the transmission rate according to the techniques described herein). For example, BTS 20 may be using power-division multiplexing to send the first series of PCCs directed to access terminal 14a together with the PCCs directed to each of the other active access terminals 14b-d on an IS-856 forward MAC channel of wireless link $WL_1$. Other examples are possible as well.

As a result of BTS 20 sending the first series of PCCs directed to access terminal 14a at the current transmission rate, access terminal 14a may be receiving the first series of PCCs sent by BTS 20 at the current transmission rate. (As noted above, however, access terminal 14a may fail to receive some PCCs in the first series of PCCs sent by BTS 20 due to poor forward-link conditions or other factors.) In response to each PCC in the first series received from BTS 20, access terminal 14a may then adjust its reverse transmission power in accordance with the received PCC.

At step 34, BTS 20 may be maintaining an indicator of forward signal quality detected by access terminal 14a, such as by updating a stored forward-signal-quality indicator for access terminal 14a. BTS 20 may update the stored forward-signal-quality indicator in various manners. As one example, BTS 20 may update the stored forward-signal-quality indicator based on a forward-signal-quality indicator received from active terminal 14a. For instance, according to IS-856, BTS 20 may be receiving from access terminal 14a a series of DRC-channel messages that each includes a "DRC Value," which specifies a rate at which access terminal 14a is requesting data and corresponds to the forward signal quality detected by access terminal 14a. As such, BTS 20 may update the stored forward-signal-quality indicator based on one or more DRC values received from access terminal 14a. Other examples are possible as well.

The forward-signal-quality indicator may take various forms. As one example, the forward-signal-quality indicator may be a measured value of the forward signal quality, such as a $E_c/I_o$, SINR, or C/I value. As another example, the forward-signal-quality indicator may be an indicator generated based on one or more DRC values received from access terminal 14a, such as a last DRC value received from access terminal 14a or an average of DRC values recently received from access terminal 14a. Other examples are possible as well.

At step 36, BTS 20 may decide whether to adjust the PCC transmission rate for access terminal 14a based on the maintained forward-signal-quality indicator. BTS 20 may perform this function at various times. For example, BTS 20 may decide whether to adjust the PCC transmission rate for access terminal 14a at a predefined rate. As another example, BTS 20 may decide whether to adjust the PCC transmission rate for access terminal 14a each time BTS 20 receives a forward-signal-quality indicator from access terminal 14a and/or updates the stored forward-signal-quality indicator. Other examples are possible as well.

BTS 20 may decide whether to adjust the PCC transmission rate for access terminal 14a based on the maintained indicator in various manners. In one example, BTS 20 may decide whether to adjust the PCC transmission rate for access terminal 14a based on a comparison between the maintained forward-signal-quality indicator and a threshold value that defines whether forward signal quality is stronger or weaker (e.g., a predefined DRC value). For instance, BTS 20 may compare the maintained forward-signal-quality indicator to a forward-signal-quality threshold value and thereby determine that the maintained forward-signal-quality indicator is greater than the forward-signal-quality threshold value (thus indicating a stronger forward signal quality). In response, BTS 20 may decide to decrease the PCC transmission rate for access terminal 14a from the current transmission rate to a lower transmission rate (unless the BTS 20 is already sending PCCs directed to access terminal 14a at the lower transmission rate). Alternatively, BTS 20 may compare the maintained forward-signal-quality indicator to a forward-signal-quality threshold value and thereby determine that the maintained forward-signal-quality indicator is less than the forward-signal-quality threshold value (thus indicating a weaker forward signal quality). In response, BTS 20 may decide to increase the PCC transmission rate for access terminal 14a from the current transmission rate to a higher transmission rate (unless the BTS 20 is already sending PCCs directed to access terminal 14a at the higher transmission rate). Other examples are possible as well.

In another example, BTS 20 may decide whether to adjust the PCC transmission rate for access terminal 14a based on a table correlating forward-signal-quality indicators with transmission rates. Table 1 is an example of one such table:

TABLE 1

| DRC Value | PPCs/second |
| --- | --- |
| 1 | 600 |
| 2 | 600 |
| 3 | 600 |
| 4 | 600 |
| 5 | 600 |
| 6 | 600 |
| 7 | 300 |
| 8 | 300 |
| 9 | 300 |
| 10 | 200 |
| 11 | 200 |
| 12 | 200 |

The table may take other forms as well. BTS 20 may consult such a table to identify a transmission rate that correlates to the maintained forward-signal-quality indicator. BTS 20 may then determine that the identified rate is the same as the current transmission rate and responsively decide not to adjust the PCC transmission rate for access terminal 14*a*. Alternatively, access terminal 14*a* may determine that the identified rate differs from the current transmission rate and responsively decide to adjust the PCC transmission rate for access terminal 14*a* to the identifier rate.

At step 38, in response to deciding to adjust the PCC transmission rate for access terminal 14*a*, BTS 20 may begin sending a second series of PCCs directed to access terminal 14*a* at the adjusted transmission rate. For instance, in response to deciding to adjust the PCC transmission rate for access terminal 14*a* to a lower transmission rate (e.g., one PCC every other timeslot), BTS 20 may begin sending a second series of PCCs directed to access terminal 14*a* at the lower transmission rate. Alternatively, in response to deciding to adjust the PCC transmission rate for access terminal 14*a* to a higher transmission rate (e.g., one PCC every timeslot as in IS-856), BTS 20 may begin sending a second series of PCCs directed to access terminal 14*a* at the higher transmission rate. In either case, as with the first series of PCCs, BTS 20 may be using power-division multiplexing to send the second series of PCCs directed to access terminal 14*a* together with the PCCs directed to each of the other active access terminals 14*b-d* on an IS-856 forward MAC channel of wireless link WL$_1$. Other examples are possible as well.

As a result of BTS 20 sending the second series of PCCs directed to access terminal 14*a* at the adjusted transmission rate, access terminal 14*a* may be receiving the second series of PCCs sent by BTS 20 at the adjusted transmission rate. (As noted above, however, access terminal 14*a* may fail to receive some PCCs in the second series of PCCs sent by BTS 20 due to poor forward-link conditions or other factors.) In response to each PCC in the second series received from BTS 20, access terminal 14*a* may then adjust its reverse transmission power in accordance with the received PCC.

While carrying out exemplary method 30, there may be time periods during which BTS 20 is sending PCCs directed to access terminal 14*a* at a transmission rate of one PCC in less than every forward-link timeslot. In the forward-link timeslots during which BTS 20 does not send a PCC directed to access terminal 14*a*, BTS 20 may divide the total forward-link power equally between the other active access terminals 14*b-d* and thereby allocate a higher power to the PCCs directed to active access terminals 14*b-d* than in forward-link timeslots during which BTS 20 sends PCCs directed to all active access terminals 14*a-d*. For example, if the total forward-link power is 16 watts, BTS 20 may allocate 5.3 watts of power to PCCs directed to each of only active access terminals 14*b-d* instead of 4 watts of power to PCCs directed to each of all active access terminals 14*a-d*. Other examples are possible as well.

Accordingly, while sending PCCs directed to access terminal 14*a* at a transmission rate of one PCC in less than every forward-link timeslot, BTS 20 may send PCCs directed to the other active access terminals 14*b-d* at a higher gain in certain forward-link timeslots. These higher-gain PCCs may in turn increase the percentage of PCCs received by the other active access terminals 14*b-d*, which is especially advantageous for any of the other active access terminals 14*b-d* that are detecting a weaker forward signal quality and are thus receiving a smaller percentage of their PCCs.

One implementation of exemplary method 30 will now be described with reference to FIG. 3, which illustrates a rate and gain of PCCs sent from BTS 20 to each of active access terminals 14*a-d* on the forward link of wireless link WL$_1$. For purposes of illustration, FIG. 3 depicts the forward link of wireless link WL$_1$ as comprising a plurality of timeslots T$_1$-T$_{15}$ and assumes that the total forward-link power is 16 watts.

As shown during timeslots T$_1$-T$_4$, BTS 20 may initially be sending PCCs directed to each of the active access terminals 14*a-d* at a rate of one PCC every forward-link timeslot. Thus, in each of timeslots T$_1$-T$_4$, BTS 20 may divide the total forward-link power equally between active access terminals 14*a-d*, thereby allotting a 4-watt gain to the PCCs directed to each of all active access terminals 14*a-d*.

Before timeslot T$_5$, BTS 20 may then determine that a maintained forward-signal-quality indicator for access terminal 14*a* has risen above a forward-signal-quality threshold value (thus indicating a stronger forward signal quality). In response, BTS 20 may decrease the PCC transmission rate for access terminal 14*a* from one PCC every forward-link timeslot to one PCC every other forward-link timeslot. As a result, starting at timeslot T$_5$, BTS 20 may begin alternating between sending 5.3-watt PCCs directed to each of only active access terminals 14*b-d* and sending 4-watt PCCs directed to each of all active access terminals 14*a-d*.

Before timeslot T$_9$, BTS 20 may then determine that a maintained forward-signal-quality indicator for access terminal 14*b* has also risen above the forward-signal-quality threshold value (thus indicating a stronger forward signal quality). In response, BTS 20 may decrease the PCC transmission rate for access terminal 14*b* from one PCC every forward-link timeslot to one PCC every other forward-link timeslot. As a result, starting at timeslot T$_9$, BTS 20 may begin alternating between sending 8-watt PCCs directed to each of only active access terminals 14*c-d* and sending 4-watt PCCs directed to each of all active access terminals 14*a-d*.

Before timeslot T$_{11}$, BTS 20 may then determine that the maintained forward-signal-quality indicator for access terminal 14*a* has fallen back below the forward-signal-quality threshold value (thus indicating a weaker forward signal quality). In response, BTS 20 may increase the PCC transmission rate for access terminal 14*a* from one PCC every other forward-link timeslot back to one PCC every forward-link timeslot. As a result, starting at timeslot T$_{11}$, BTS 20 may begin alternating between sending 5.3-watt PCCs directed to each of only active access terminals 14*a* and 14*c-d* and sending 4-watt PCCs directed to each of all active access terminals 14*a-d*.

In a similar manner, BTS 20 may continue adjusting the rate (and gain) at which to send PCCs directed to active access terminals 14a-d, as well as any new active access terminals, while those access terminals remain active.

IV. Exemplary BTS

Figure 4:
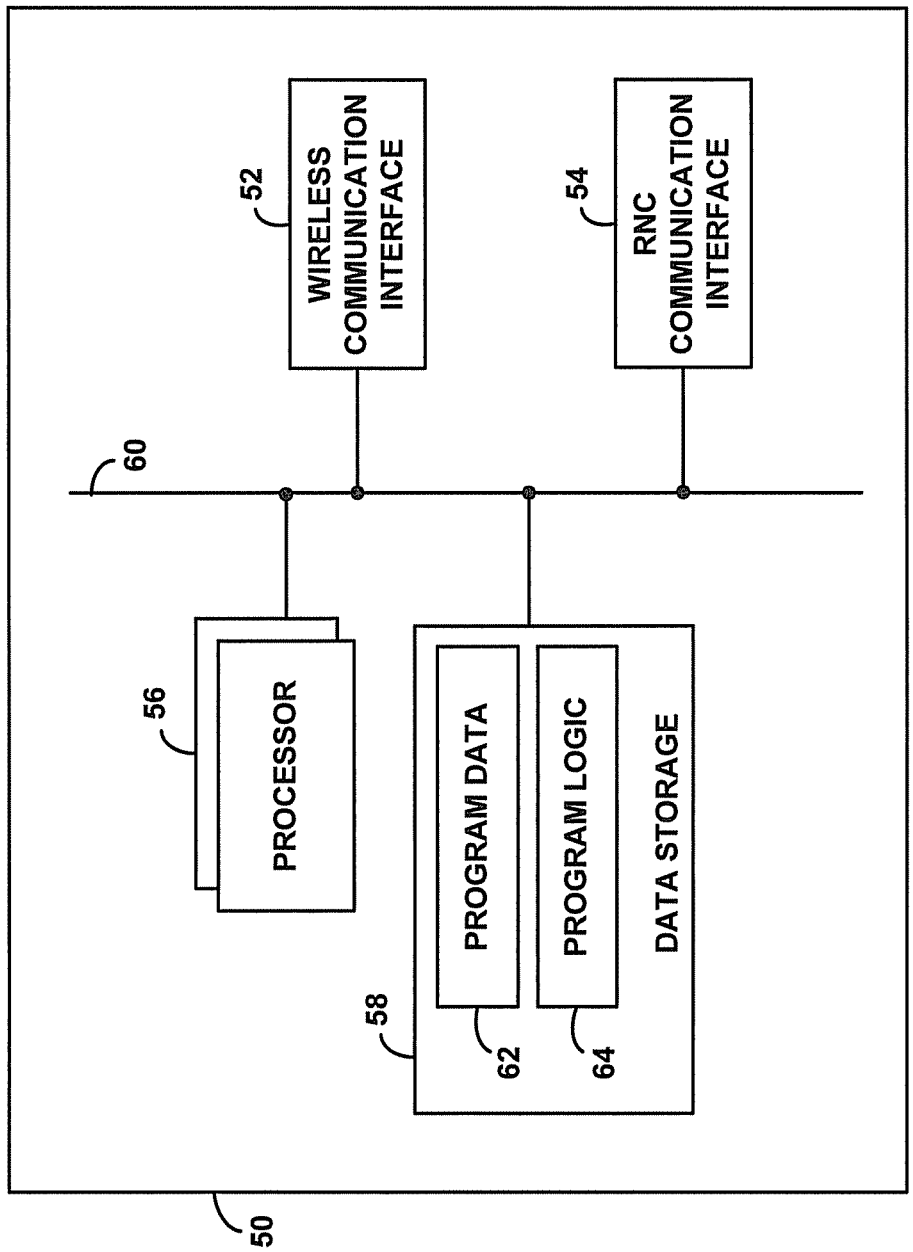
FIG. 4 is a simplified block diagram showing functional components of an exemplary base transceiver station capable of carrying out the exemplary method of FIG. 2.

FIG. 4 is a simplified block diagram showing functional components of an exemplary BTS 50 capable of carrying out feature of exemplary method 30 of FIG. 2. (It should be understood, however, that one or more other access network entities may be capable carrying out features of the exemplary method 30). As shown in FIG. 4, exemplary BTS 50 may include a wireless communication interface 52, an RNC communication interface 54, a processor 56, and data storage 58, all linked together via a system bus, network, or other connection mechanism 60. BTS 50 may include other components as well.

Referring to FIG. 4, wireless communication interface 52 may radiate to define one or more wireless coverage areas and provide one or more wireless links, such as wireless link $WL_1$, over which access terminals may communicate with BTS 50. As such, wireless communication interface 52 may include one or more antenna structures arranged in various ways (e.g., one or more directional or sectored antennas). Additionally, wireless communication interface 52 may include at least one power amplifier for each provided wireless link. Each such power amplifier may enable BTS 20 to adjust both its total transmission power on each forward link and its transmission power on each respective channel of each forward link. In this respect, each such power amplifier may also define practical limits on the maximum and minimum power levels at which BTS 50 can transmit on each forward link and each respective channel of each forward link. Other configurations are possible as well.

RNC communication interface 54 may function to communicatively couple BTS 50 to an RNC, such as RNC 22. As such, RNC communication interface 54 may take the form of an Ethernet interface, a serial bus interface (e.g., Firewire, USB 2.0, etc.), a chipset and antenna adapted to facilitate wireless communication according a desired protocol, and/or any other interface that provides for wired and/or wireless communication with an RNC. RNC communication interface 54 may also include multiple interfaces, such as an Ethernet interface and a serial bus interface. Other configurations are possible as well.

Processor 56 may comprise one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), or other processor components now known or later developed. Data storage 58, in turn, may comprise one or more non-transitory computer-readable storage mediums, such as volatile data storage mediums (e.g., random access memory (RAM), registers, and/or cache) and/or non-volatile data storage mediums (e.g., read only memory (ROM), a hard disk drive, a solid state drive, flash memory, an optical storage device, and/or a floppy disk). Some data storage mediums may be integrated in whole or in part with the processor 54. Further, some data storage mediums may be external to and/or removable from BTS 50 and may interface with BTS 50 in various manners (e.g., via the communication interface 54). As shown, data storage 58 may contain (i) program data 62 and (ii) program logic 64, which may be maintained either separately or together within data storage 58.

Program data 62 may contain information related to active access terminals in communication with BTS 50. For example, program data 62 may contain one or more identifiers of the active access terminals in communication with BTS 50. As another example, program data 62 may contain an identifier of the wireless link(s) over which each access terminal is communicating with BTS 50. As still another example, program data 62 may contain an indicator forward signal quality detected by each access terminal on its serving wireless link, such as a last DRC value received from each access terminal or an average of DRC values recently received from each access terminal for instance. Program data 62 may contain other data related to the access terminals 14 as well.

Program data 62 may also contain information related to a PCC transmission scheme. For example, program data 62 may contain an indicator of a PCC transmission rate for each active access terminal. As another example, program data 62 may contain indicators of available PCC transmission rates (e.g., 600 PCCs per second, 300 PCCs per second, etc.). As yet another example, program data 62 may contain a forward-signal-quality threshold value (e.g., a predefined DRC value) for comparison with a forward-signal-quality indicator, which BTS 50 may use to implement the exemplary PCC transmission scheme described above. As yet another example, program data 62 may contain a table correlating indicators of forward signal qualities with transmission rates (e.g., Table 1 shown above), which BTS 50 may use to implement the exemplary PCC transmission scheme described above. Program data 62 may contain other information related to a PCC transmission scheme as well.

Program logic 64 preferably comprises machine-language instructions that may be executed or interpreted by processor 56 to carry out functions in accordance with exemplary method 30 described in FIG. 2. For example, program logic 64 may be executable by processor 56 to (a) send first series of PCCs directed to an access terminal at a current transmission rate (e.g., one PCC every forward-link timeslot), (b) maintain an indicator of forward signal quality detected by the access terminal, (c) decide to adjust a PCC transmission rate for the access terminal based on the maintained forward-signal-quality, and (d) in response to deciding to adjust the PCC transmission rate, send a second series of PCCs directed to the access terminal at the adjusted transmission rate (e.g., one PCC every other forward-link timeslot). Program logic 64 may be executable by processor 56 to carry out various other functions as well.

V. Conclusion

Exemplary embodiments have been described above. Those skilled in the art will understand, however, that changes and modifications may be made to the embodiments described without departing from the true scope and spirit of the present invention, which is defined by the claims.

I claim:

1. A method of sending power control commands (PCCs) to a first active access terminal of a plurality of active access terminals in a given coverage area, the method comprising:
   an access network sending a first series of PCCs directed to the first active access terminal at a current transmission rate;
   the access network maintaining an indicator of forward signal quality detected by the first active access terminal;
   based on the maintained indicator of forward signal quality detected by the first active access terminal, the access network deciding to adjust the transmission rate at which to send PCCs directed to the first active access terminal to an adjusted transmission rate; and in response to deciding to adjust the transmission rate, the access network sending a second series of PCCs directed to the first active access terminal at the adjusted transmission rate.

2. The method of claim 1, wherein sending the first and second series of PCCs directed to the first active access terminal comprises using power-division multiplexing to send the first and second series of PCCs directed to the first active access terminal together with PCCs directed to one or more other active terminals.

3. The method of claim 1, wherein sending the first and second series of PCCs directed to the first active access terminal comprises sending the first and second series of PCCs directed to the first active access terminal on a forward link comprising a plurality of timeslots, wherein the current transmission rate comprises one PCC in every timeslot, and wherein the adjusted transmission rate comprises one PCC in less than every timeslot.

4. The method of claim 1, wherein the maintained indicator of forward signal quality detected by the first active access terminal comprises an indicator generated based on information received from the first active access terminal.

5. The method of claim 4, further comprising:
receiving from the first active access terminal a series of messages on an IS-856 data rate control (DRC) channel, wherein each message includes a DRC value, and
wherein the maintained indicator of forward signal quality detected by the first active access terminal comprises an indicator generated based on one or more of the DRC values.

6. The method of claim 1, wherein deciding to adjust the transmission rate based on the maintained indicator of forward signal quality detected by the first active access terminal comprises deciding to adjust the transmission rate based on a comparison between the maintained indicator of forward signal quality detected by the first active access terminal and a threshold value.

7. The method of claim 6, wherein deciding to adjust the transmission rate based on a comparison between the maintained indicator of forward signal quality detected by first active access terminal and a threshold value comprises:
comparing the maintained indicator of the forward signal quality detected by the first active access terminal and thereby determining that the maintained indicator of the forward signal quality detected by the first active access terminal is greater than the threshold value; and
in response to determining that the maintained indicator of the forward signal quality detected by the first active access terminal is greater than the threshold value, deciding to decrease the transmission rate at which to send PCCs directed to the first active access terminal.

8. The method of claim 6, wherein deciding to adjust the transmission rate based on a comparison between the maintained indicator of forward signal quality detected by first active access terminal and a threshold value comprises:
comparing the maintained indicator of the forward signal quality detected by the first active access terminal and thereby determining that the maintained indicator of the forward signal quality detected by the first active access terminal is less than the threshold value; and
in response to determining that the maintained indicator of the forward signal quality detected by the first active access terminal is less than the threshold value, deciding to increase the transmission rate at which to send PCCs directed to the first active access terminal.

9. The method of claim 1, wherein deciding to adjust the transmission rate based on the maintained indicator of forward signal quality detected by the first active access terminal comprises deciding to adjust the transmission rate based on a table correlating indicators of forward signal qualities with indicators of transmission rates.

10. The method of claim 9, wherein deciding to adjust the transmission rate based on the table correlating indicators of forward signal qualities with transmission rates comprises:
consulting the table to identify a transmission rate that correlates to the maintained indicator of the forward signal quality detected by the first access terminal;
determining that the identified transmission rate differs from the current transmission rate; and
in response to determining that the identified transmission rate differs from the current transmission rate, deciding to adjust the transmission rate to the identified transmission rate.

11. A method of sending, on a forward link comprising a plurality of timeslots, power control commands (PCCs) directed to a plurality of active access terminals in a given coverage area, the method comprising:
an access network maintaining an indicator of forward signal quality detected by each of the plurality of active access terminals;
during a first series of timeslots, the access network sending PCCs directed to each of the plurality of active access terminals in every timeslot;
the access network determining that a maintained indicator of forward signal quality detected by a first active access terminal of the plurality of active access terminals is greater than a threshold value; and
in response to determining that the maintained indicator of forward signal quality detected by the first active access terminal is greater than the threshold value, during a second series of timeslots, the access network sending PCCs directed to the first active access terminal in less than every timeslot and sending PCCs directed to the other active access terminals in every timeslot.

12. The method of claim 11, wherein, during the first series of timeslots, sending the PCCs directed to each of the plurality of active access terminals in every timeslot comprises:
during each timeslot of the first series of timeslots, (a) dividing a total power of the forward link equally between each of the plurality of active access terminals and thereby allocating a first gain to the PCCs directed to each of the plurality of active access terminals, and (b) sending the PCCs directed to each of the plurality of active access terminals at the first gain.

13. The method of claim 11, wherein, during the second series of timeslots, sending the PCCs directed to the first active access terminal in less than every timeslot and sending the PCCs directed to the other active access terminals in every timeslot using power-division multiplexing comprises:
during each timeslot of a first group of the second series of timeslots, (a) dividing a total power of the forward link equally between each of the plurality of active access terminals and thereby allocating a first gain to the PCCs directed to each of the plurality of active access terminals, and (b) sending the PCCs directed to each of the plurality of active access terminals at the first gain; and
during each timeslot of a second group of the second series of timeslots, (a) dividing a total power of the forward link equally between each of the other active access terminals and thereby allocating a second gain to the PCCs directed to each of the other active access terminals, wherein the second gain is higher than the first gain, and (b) sending the PCCs directed to each of the other active access terminals at the second gain.

14. The method of claim 11, wherein sending PCCs directed to the first active access terminal in less than every timeslot comprises sending PCCs directed to the first active access terminal in every other timeslot.

15. The method of claim 11, further comprising:
   determining that a maintained indicator of forward signal quality detected by a second active access terminal of the plurality of active access terminals is greater than the threshold value; and
   in response to determining that the maintained indicator of forward signal quality detected by the second active access terminal is greater than the threshold value, during a third series of timeslots, sending PCCs directed to the first active access terminal and the second active access terminal in less than every timeslot and sending PCCs directed to the other active access terminals in every timeslot.

16. The method of claim 15, further comprising:
   determining that the maintained indicator of forward signal quality detected by first active access terminal is less than the threshold value; and
   in response to determining that the maintained indicator of forward signal quality detected by first active access terminal is less than the threshold value, during a fourth series of timeslots, sending PCCs directed to the second active access terminal in less than every timeslot and sending PCCs directed to the other active access terminals in every timeslot.

17. A base transceiver station (BTS) comprising:
   a wireless communication interface configured to provide at least one wireless link over which to communicate with a plurality of active access terminals in a given coverage area;
   a radio network controller (RNC) communication interface configured to provide connectivity with an RNC;
   a processor;
   data storage; and
   program instructions stored in data storage and executable by the processor to:
      send a first series of power control commands (PCCs) directed to a first active access terminal of the plurality of active access terminals at a current transmission rate;
      maintain an indicator of forward signal quality detected by the first active access terminal;
      based on the maintained indicator of forward signal quality detected by the first active access terminal, decide to adjust the transmission rate at which to send PCCs directed to the first active access terminal to an adjusted transmission rate; and
      in response to deciding to adjust the transmission rate, send a second series of PCCs directed to the first active access terminal at the adjusted transmission rate.

18. The BTS of claim 17, further comprising program data stored in data storage comprising a threshold value for comparison with the maintained indicator of forward signal quality detected by the first active access terminal.

19. The BTS of claim 17, further comprising program data stored in data storage comprising a table correlating indicators of forward signal qualities with transmission rates.

20. The BTS of claim 17, further comprising program data stored in data storage comprising an indicator of a transmission rate at which the BTS is sending PCCs directed to each of the plurality of active access terminals.

* * * * *